United States Patent [19]

Carlberg et al.

[11] 4,231,869
[45] Nov. 4, 1980

[54] PERMANENT COBALT CATALYST FOR SULFITE OXYGEN SCAVENGING

[75] Inventors: Bob L. Carlberg; Robert A. Hart, both of Ponca City, Okla.

[73] Assignee: Conoco, Inc., Ponca City, Okla.

[21] Appl. No.: 21,418

[22] Filed: Mar. 19, 1979

Related U.S. Application Data

[63] Continuation of Ser. No. 899,629, Apr. 24, 1978, abandoned.

[51] Int. Cl.$^3$ ................................................ C02F 1/72
[52] U.S. Cl. .................................. 210/763; 166/244 C
[58] Field of Search ................... 166/244 C, 275, 300, 166/310; 210/36, 38 B, 50, 59, 63 R; 252/8.55 E, 188, 431 R, 472

[56] References Cited

U.S. PATENT DOCUMENTS

| | | | |
|---|---|---|---|
| 3,618,667 | 11/1971 | Snavely | 210/63 R |
| 3,625,888 | 12/1971 | Redmore et al. | 252/8.55 E |
| 3,764,548 | 10/1973 | Redmore | 252/8.55 E |
| 3,808,138 | 4/1974 | Yamaguchi et al. | 252/188 |
| 3,920,545 | 11/1975 | Argabright et al. | 210/38 B |

OTHER PUBLICATIONS

Uhlig, Herbert H., Corrosion and Corrosion Control, John Wiley and Sons, Inc., N.Y., 1963, pp. 272-273.

*Primary Examiner*—Ivars C. Cintins
*Attorney, Agent, or Firm*—Cortlan R. Schupbach, Jr.

[57] ABSTRACT

In the recovery of hydrocarbons from petroliferous formations wherein water is injected into the formation through a borehole, oxygen is scavenged from water employed in recovery applications requiring low oxygen levels by mixing with a source of sulfite ion, said mixture then being passed over a cation exchange resin on which a cobalt ion or other metallic catalyst is adsorbed. The catalyst increases the reaction rate of the sulfite ion and the oxygen to form sulfate ion, while the resin maintains the cobalt in place.

6 Claims, No Drawings
}

PERMANENT COBALT CATALYST FOR SULFITE OXYGEN SCAVENGING

This is a continuation of U.S. Ser. No. 899,629, filed Apr. 24, 1978, now abandoned.

This invention relates to a method for removing oxygen from water. More particularly, this invention relates to a method for removing oxygen from water using sulfite ions and catalysts to form sulfate ions.

Corrosion of pipelines because of oxygen dissolved in water has long been a problem recognized in the art. Oxygen is likewise not desirable in many applications in the petroleum industry, such as in water injected into petroliferous formations to enhance recovery because of equipment corrosion. Thus it becomes important to lower the oxygen content of water to acceptable levels for many uses.

Sodium sulfite, sodium bisulfite, and sulfur dioxide are commonly used to scavenge oxygen from waters by the reaction

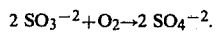
$$2\ SO_3^{-2} + O_2 \rightarrow 2\ SO_4^{-2}.$$

It is well known that this reaction is slow unless a catalyst is used.

U.S. Pat. No. 3,618,667 discloses conventional technology involving scavenging oxygen from water employing sodiur sulfite and the catalyst of a divalent metallic ion, such as cobalt. This patent is hereby incorporated by reference. The patent specifically discloses adding a transition metal catalyst such as cobalt to water which contains hydrogen sulfide and oxygen dissolved therein to catalyze the rection between sulfite ion and oxygen, thus removing oxygen from the water. In column 4 of the reference it is disclosed that a transition metal may be added in metallic form or in ionic form but that the ionic form was preferred because it becomes more uniformly dispersed throughout the solution. The reference also discloses that catalysts in metallic form can be employed by passing the solution through a metal screen. Sulfide ions are specifically disclosed to be detrimetal to the process.

U.S. Pat. No. 2,906,714 discloses adsorbing an anionic ceric acid complex onto an ion exchange resin. The resin with the ceric compound adsorbed thereon and in the sulfate form was shown to have greater capacity for moving color bodies from raw sugar solution then the same sulfate ion exchange resin without the ceric compound. U.S. Pat. No. 3,808,138 discloses removing oxygen from water by dding hydrazine and cobalt maleic acid hydrazide.

However, the prior art processes as known in the art and as exemplified by the references cited, have a severe disadvantage in that dispersion of the catalyst throughout the water to be scavenged of oxygen requires that the material be in ionic form. Thus the catalyst is lost as the water is used, leading to high levels of catalyst consumption. In petrochemical uses, large amounts of water must be used for injection into underground formations, leading to high levels of catalyst use.

It would therefore be of great benefit to devise a method whereby catalyst use could be greatly reduced while maintaining efficient removal of oxygen from water.

It is therefore an object of the present invention to provide a permanent cobalt catalyst for sulfite oxygen scavengers. Other objects will become apparent to those skilled in this art as the description proceeds.

The present invention thus deals with a method for the recovery of hydrocarbons from petroliferous formations wherein water is injected into the formation through a wellbore, the method comprising reducing oxygen levels by mixing said water with a source of sulfite ion, said mixture then being passed over a cation exchange resin having cobalt ions or other metallic catalyst adsorbed thereon.

It has now been discovered that a permanent cobalt catalyst for sulfite oxygen scavenging systems to remove oxygen from water can be formed by adsorbing cobaltous ions upon cation exchange resins. The resin beads so formed are then placed such that they are contacted by the water to be treated. The adsorbed ion continues to function as a catalyst while the ion saturated resin remains in place in the system, thus removing the necessity for continuously adding catalysts to the system. The instant invention is more concretely described with reference to the example below wherein all parts and percentages are by weight unless otherwise specified. The example is intended to exemplify the instant invention and not to limit it.

EXAMPLE 1

Dissolved oxygen in 1 liter of tap water was measured with dissolved oxygen meter (membrane electrode type) and found to be about 4 milligrams/liter. Sodium sulfite in a ratio of 15 milligrams/liter to 1 milligram/liter (parts per million (ppm) of oxygen was added to the water, and time to reach minimum scavenge value (0.01 ppm oxygen) was measured. The experiment was repeated 12 times for an average uncatalyzed reaction time to 0.01 ppm oxygen of 333 seconds.

EXAMPLE 2

A cation exchange resin (Dowex 50W, trademark of and sold by Dow Chemical Company) was placed into a solution of cobalt chloride (about 1 molar) in distilled water. The resin was allowed to remain immersed in the water containing cobalt chloride at room temperature for a time sufficient to allow the cobaltous ions to become adsorbed upon the resin. The adsorption occurred fairly rapidly as the affinity for cobaltous ions seemed high using this resin.

The cobalt-containing beads formed were then added (approximately 100 beads) to 1 liter of water with sodium sulfite also being added in the same ratio as described in Example 1. The time to reach minimum scavenged value was measured to dissolved oxygen meter. As in Example 1 this test was repeated 12 times and the average time to reach 0.01 ppm oxygen was 182 seconds.

EXAMPLE 3

Tap water containing 6 milligrams/liter oxygen was used in a continuously flowing system. Sodium sulfite in a ratio of 8 to 1 (plus a 10 milligram/liter excess) was added continuously. The treated tap water was continuously passed through a bed of cobalt-containing ion exchange resin prepared as described in Example 2.

A continuous recorded monitoring of dissolved oxygen levels was made downstream of the catalyst bed. Dissolved oxygen levels fell to 0.01 milligrams/liter in less then one minute. The system was maintained in constant operation for one month with no catalyst change whatsoever, with constant recording of oxygen levels. At the end of the experiment dissolved oxygen levels were 0.01 milligrams/liter. Occasional air bubbles in the system caused recording blips, but dissolved oxygen remained constant.

The treated water was tested for cobalt content. Less then 0.1 parts per million cobalt (below detectable levels) was found.

Representative examples of strongly acidic cation exchange resins which are useful in the process of the instant invention are those trademarked and sold by Dow Chemical Company as Dowex 50W, HCR-S, HCR-U, HGR, HGR-U by Rohm and Haas as Amberlite 120, Amberlite 122, Amberlite 200, and Amberlite 252 and those sold by Diamond Shamrock as Duolite C-20, C-25 and ES-26.

Catalysts are placed on the resin simply by making a water solution of the catalyst and immersing the cation exchange resin in the solution so formed. The catalyst can have counterions of any type which are water soluble and which are not detrimental to the end use to which the water is to be put. Representative examples of such materials are cobaltous chloride, cobaltous bromide, cobaltous iodide and cobaltous nitrate.

Likewise, the sulfite may be added to the water by any means providing water soluble counter-ions not detrimental to the end use. Representative examples of such forms are sodium sulfite, sodium bisulfite, potassium sulfite and lithium sulfite. Likewise, $SO_2$ can be sparged into the water to produce necessary sulfite levels. Sulfite to oxygen levels can range from stoichiometric to a 3 times stoichiometric excess of sulfite. Normally, a stoichiometric amount of sulfite plus about 10 parts per million excess will be used and is preferred.

Once the catalyst has been placed upon the cation exchange resin, water may be passed through the resin using any one of the systems well known to those skilled in this art, such as by placing the resin on a screen. The resin should be immersed in the solution containing the catalyst in ionic form for a sufficient period of time to allow the catalyst to adsorb onto the resin. Normally, this period of time will be at least three minutes. Preferred ranges are from three minutes to an hour and most preferred are from 5 minutes to 30 minutes.

Thus, the instant invention has provided a method for decreasing catalyst consumption and scavenging oxygen from water by providing a permanent catalyst for sulfite/oxygen scavenging systems.

While certain embodiments and details have been shown for the purpose of illustrating this invention, it will be apparent to those skilled in this art that various changes and modifications may be made herein without departing from the spirit or the scope of the invention.

We claim:

1. In the recovery of hydrocarbons from petroliferous formations wherein water is injected into the formation through a wellbore, the method comprising reducing oxygen levels by mixing said water with a source of sulfite ion, said mixture then being passed over a catalyst bed containing water insoluble cation exchange resin having cobalt ions adsorbed thereon such that treated low oxygen content water contains substantially no cobalt ion.

2. A method as described in claim 1 wherein cobalt ions are adsorbed onto the cation exchange resin by immersing said resin in a water solution containing cobalt ions.

3. A method as described in claim 2 wherein the cobalt is provided by a material selected from the group consisting of cobalt chloride, cobalt bromide, cobalt iodide, and cobalt nitrate.

4. A method as described in claim 3 wherein the resin is immersed in a water solution of catalyst for at least 3 minutes prior to use.

5. A method as described in claim 3 wherein the water to be treated has sulfite ions present in at least stoichiometric ratio with dissolved oxygen.

6. A method as described in claim 5 wherein at least a 10 part per million excess of sulfite ions is present.

* * * * *